United States Patent
Choi et al.

(10) Patent No.: US 10,658,930 B2
(45) Date of Patent: May 19, 2020

(54) BUCK BOOST CONVERTER

(71) Applicants: DESTINPOWER INC., Gyeonggi-do (KR); FOUNDATION FOR RESEARCH AND BUSINESS, SEOUL NATIONAL UNIVERSITY OF SCIENCE AND TECHNOLOGY, Seoul (KR)

(72) Inventors: Sewan Choi, Seoul (KR); Seongjin Oh, Seoul (KR); Yeonwoo Kim, Seoul (KR); Daeki Yang, Osan-si (KR); Minho Kwon, Seoul (KR); Sehyung Jung, Anseong-si (KR); Byeonggill Han, Seoul (KR); Minjae Kim, Seoul (KR); Minkook Kim, Yongin-si (KR)

(73) Assignees: DESTINPOWER INC., Seongnam-si, Gyeonggi-do (KR); Foundation for Research and Business, Seoul National University of Science and Technology, Seoul (KR)

( * ) Notice: Subject to any disclaimer, the term of this patent is extended or adjusted under 35 U.S.C. 154(b) by 0 days.

(21) Appl. No.: 16/327,120

(22) PCT Filed: Jun. 9, 2017

(86) PCT No.: PCT/KR2017/006001
§ 371 (c)(1),
(2) Date: Feb. 21, 2019

(87) PCT Pub. No.: WO2018/038362
PCT Pub. Date: Mar. 1, 2018

(65) Prior Publication Data
US 2019/0181760 A1    Jun. 13, 2019

(30) Foreign Application Priority Data

Aug. 22, 2016 (KR) .......................... 10-2016-0106081
Mar. 27, 2017 (KR) .......................... 10-2017-0038727

(51) Int. Cl.
H02M 7/48       (2007.01)
H02M 3/158      (2006.01)
(Continued)

(52) U.S. Cl.
CPC .......... H02M 3/1582 (2013.01); H02M 1/08 (2013.01); H02M 2001/0003 (2013.01); H02M 2001/0054 (2013.01); H02M 2003/1586 (2013.01)

(58) Field of Classification Search
CPC ................ H02M 3/1582; H02M 1/08; H02M 2001/0003; H02M 2001/0054; H02M 2003/1586; H02J 1/108
(Continued)

(56) References Cited

U.S. PATENT DOCUMENTS 6,104,104 A * 8/2000 Kuroki ...................... H02J 9/06
                                                         307/43
6,310,787 B2 * 10/2001 Ito ........................ H02M 5/4585
                                                         363/17
(Continued)

FOREIGN PATENT DOCUMENTS

EP          2720363 A1      4/2014
JP       2013-236435 A     11/2013
(Continued)

OTHER PUBLICATIONS

Vellaiyarasi, M. et al., "Interleaved Buck Boost Converter Fed DC Motor.", In: International Journal of Electrical Engineering, 2013, vol. 6, No. 3, pp. 301-309, ISSN 0974-2158 (Year: NA).*
(Continued)

*Primary Examiner* — Rajnikant B Patel
(74) *Attorney, Agent, or Firm* — Rabin & Berdo, P.C.

(57) ABSTRACT

The present technique discloses a buck-boost converter. According to a detailed example of the present invention, a
(Continued)

number of switching elements of a buck-boost converter is reduced compared with a conventional buck-boost converter, and thereby a buck mode and a boost mode are performed with reduced overall conduction loss and switching loss. In addition, a buck-boost converter that is capable of stepping up and down an input voltage over a wide range using a single control device, that has a simple structure, that has inexpensive manufacturing costs, and that has a high circuit integration density can be realized by configuring the buck-boost converter to connect a two-phase interleaving boost converter unit to a single-phase buck converter unit.

18 Claims, 10 Drawing Sheets

(51) Int. Cl.
*H02M 1/08* (2006.01)
*H02M 1/00* (2006.01)

(58) Field of Classification Search
USPC ......... 323/222, 235, 249, 271, 276.282–299; 363/89.97, 98
See application file for complete search history.

(56) References Cited

U.S. PATENT DOCUMENTS

| | | | |
|---|---|---|---|
| 8,952,667 B2* | 2/2015 | Ohshita | H02M 3/1584 323/272 |
| 9,077,241 B2* | 7/2015 | Haddad | H02M 3/158 |
| 2005/0088860 A1* | 4/2005 | Okuma | H02J 9/062 363/35 |
| 2015/0188437 A1 | 7/2015 | Chan | |

FOREIGN PATENT DOCUMENTS

| | | | |
|---|---|---|---|
| KR | 10-2016-007867 | * | 1/2016 |
| KR | 10-2016-0007867 A | | 1/2016 |

OTHER PUBLICATIONS

M. Vellaiyarasi et al., "Interleaved Buck Boost Converter Fed DC Motor", International Journal of Electric Engineering, 2013, pp. 301-309, vol. 6, No. 3.

Yeonwoo Kim et al., "Development of 25kW Bi-directional Converter using SiC MOSFET for DC Nano-grid".

* cited by examiner

<Comparison of conduction loss>

<Comparison of switching loss>

BUCK BOOST CONVERTER

This invention has been published in the Korean Institute of Power Electronics (KIPE) on Jul. 5, 2016.

TECHNICAL FIELD

The present invention relates to a buck-boost converter. More particularly, the present invention relates to a method of stepping up and down an input voltage having a wide range for power supplied to a load by providing a structure where a two-phase interleaving boost converter unit and a single phase buck converter are connected, improving the entire power efficiency by minimizing switching loss and reducing conduction loss, and performing stepping up and down control by using a single control module that improves a response speed of switching control.

BACKGROUND ART

DC-DC converters are devices that receive a DC voltage and output a DC voltage of another size by transforming the same, and are widely used in various fields. DC-DC converters are classified into a buck converter operating by a voltage source and outputting a voltage lower than an input voltage, a boost converter operating by a current source and outputting a voltage higher than an input voltage, and a buck-boost converter wherein a buck converter and a boost converter are integrated and are capable of stepping up and down an input DC voltage. Among them, a buck-boost converter is widely used in various fields as the buck-boost converter is capable of stepping up and down an input DC voltage, and thus an input voltage range may be wide and high efficiency is realized within the entire range of the input voltage.

For such a buck-boost converter, in a small power grid of less than 1 MW of a rated power lower than the micro grid, research on the application of a switching mode power supply (SMPS) of a DC nano grid is actively being studied.

In other words, in a conventional DC nano grid system, a bi-directional converter of an energy storage device may adjust amount of charging and discharging of a battery and control a DC bus voltage when a black out occurs or system failure occurs.

However, an isolated buck-boost converter may be useful since an input and an output are isolated, but usage of the transformer should be limited as primary energy of the transformer is output to secondary output when a switch is ON or OFF. In addition, in case of non isolated buck-boost converter, since input ripple current is large, a filter circuit is required in an input of the converter. In addition, a small circuit configuration where input ripple current is small is also required, and the structure is very complicated due to the necessity of additional components compared with the basic circuit configuration.

When a control device for such a buck-boost converter operates from no load to full load, and a gain is set to be higher than a predetermined reference value to improve a response speed of switching control, a transient state occurs largely. However, when the gain is set to be low to prevent such a situation, the response speed of the switching control becomes slow.

Accordingly, the present applicant proposes a buck-boost converter having a simple structure and being capable of stepping up and down an input voltage having a wide range, improving the entire power efficiency by reducing a number of switching elements, minimizing switching loss and reducing conduction loss, and by using a control module improving a response speed of switching control of the buck-boost converter, and a control device for the same.

DISCLOSURE

Technical Problem

An object of the present invention is to provide a buck-boost converter capable of stepping up or down an input voltage having a wide range.

In addition, another object of the present invention is to provide a buck-boost converter capable of improving the entire power efficiency by reducing a number of switching elements, minimizing switching loss, and reducing conduction loss.

In addition, still another object of the present invention is to provide a buck-boost converter capable of improving a response speed of switching control of the buck-boost converter, and having a simple structure using a single control device for performing stepping up and down, and thus can be manufactured at low price.

Technical Solution

In order to achieve the above object, a buck-boost converter includes: a battery; a boost converter unit having a two-phase interleaving structure and stepping up a DC voltage supplied from the battery; a link unit providing a DC link for the stepped up DC voltage to a load; a rectifying unit rectifying DC link voltage of the link unit and transferring the same to the load; a buck converter unit having a single phase stepping down the DC link voltage, and transferring the same to the load through the rectifying unit; and a control device controlling switching of the boost converter unit and the buck converter unit.

Preferably, the boost converter may include: a capacitor; at least one coil for stepping up the DC voltage applied from the battery and passing through the capacitor; and at least one switching element through which the DC power stepped up by the at least one coil passes. The least one switching element may include: at least one upper switching element connected to a second end of each coil and to a first end of the link unit, and switched by each gate signal supplied from the control device; and at least one lower switching element connected to a second end of each coil and to a second end of the capacitor, and switched by each gate signal supplied from the control device. In addition, in the boost mode, each of the upper switching element and the lower switching element may be complementarily switched to a turn-on state, and in the buck mode, each of the upper switching element may be switched to a turn-on state and each of the lower switching element operates in a turn-off state.

Preferably, in the boost mode, the buck converter unit may be provided to be connected between the first end and the second end of the link unit so as to transfer the DC link voltage to the battery via the rectifying unit, and in the buck mode, the buck converter unit is provided to step down the DC link voltage of the link unit which has become equal to or greater than a reference voltage to be the DC power of the battery.

Preferably, the buck converter unit may include: an upper switching element connected to the first end of the link unit; and a lower switching element connected to the second end of the link unit, wherein in the boost mode, the upper switching element may become a turn-on state and the lower switching element becomes a turn-off state so that the DC link voltage of the link unit is applied to the rectifying unit, and in the buck mode, the upper switching element and the lower switching element complimentarily may become a turn-on state, so that the DC link voltage that has become an overvoltage is stepped down by the upper switching element and the lower switching element, and then transferred to the rectifying unit.

Preferably, the control device may include: a voltage compensation unit compensating an error between a voltage of the load and a reference voltage; and a current compensation unit connected to an output of the voltage compensation unit, compensating current flowing in each coil, and generating a number of gate signals, wherein the current compensation unit may include: an amplifying unit amplifying command current of the battery by using a predetermined gain; a boost switching on/off controlling unit generating and transferring a gate signal for controlling switching on/off of the boost converter unit based on an error between the amplified command current and practical current flowing in the at least one coil; and a buck switching on/off controlling unit predicting current flowing in an output coil based on the command current, a boost gain, and a buck gain, and generating and transferring a number of gate signals for controlling switching on/off of the buck converter unit based on an error between the predicted current and practical current.

Preferably, the boost switching on/off controlling unit may include: a first gate signal generating module outputting a first gate signal for controlling switching of the boost converter unit by deriving an error between practical current flowing in a first input coil of the at least one coil stepping up the DC voltage applied from the battery, and the amplified command current, and by shaping the derived error; and a second gate signal generating module outputting a second gate signal for controlling switching of the boost converter unit by shaping an error between practical current flowing in a second input coil of the at least one coil stepping up the DC voltage applied from the battery and being connected to the first input coil in parallel, and the amplified command current.

Preferably, the first gate signal generating module may include: a first subtractor calculating the error between practical current of the first input coil and the amplified command current; a first controller performing proportional-integral control for the error of the first subtractor; a first adder adding a boost gain calculated from a voltage input from the battery and a voltage output to the load and an output signal of the first controller; and a first limiter generating the first gate signal by shaping an output signal of the first adder, and transferring the same to the lower switching element of the boost converter unit.

Preferably, the first gate signal generating module may further include a NAND gate transferring an inversion signal of the output signal of the first limiter to the upper switching element of the boost converter unit.

Preferably, the boost gain $d_{boost}$ is derived by subtracting a ratio of the voltage $V_B$ input from the battery to the voltage $V_L$ output to the load from 1, and satisfies [Formula 1]:

$$\text{boost gain } d_{boost}=1-V_B/V_L \qquad \text{[Formula 1]},$$

wherein, $0<V_B/V_L<1$.

Preferably, the second gate signal generating module may include: a second subtractor calculating the error between practical current of the second input coil and the amplified command current; a second controller performing proportional-integral control for the error generated in the second subtractor; a second adder adding the boost gain and an output signal of the second controller; and a second limiter generating the second gate signal by shaping an output signal of the second adder, and transferring the generated second gate signal to the lower switching element of the boost converter unit.

Preferably, the second gate signal generating module may further include a NAND gate transferring an inverse signal of an output signal of the second limiter to the upper switching element of the boost converter unit.

Preferably, the buck switching on/off controlling unit may include: a buck calculation module predicting current flowing in the output coil based on the buck gain calculated from the command current, the boost gain, and the voltage input from the battery and the voltage output to the load; and a buck control module generating a third gate signal for controlling switching on/off of the upper switching element and the lower switching element of the buck converter unit in the buck mode based on the current predicted in the buck calculation module. The buck control module may include: a first buck subtractor calculating an error between the prediction current of the buck calculation module and practical current flowing in the output of the coil; a first buck controller performing proportional-integral control for error current of the first buck subtractor; a first buck adder adding the buck gain and an output signal of the first buck controller; and a first buck limiter generating the third gate signal by shaping an output signal of the first buck adder, and transferring the generated third gate signal to the upper switching element of the buck converter unit.

Preferably, the buck gain $d_{buck}$ is derived by a ratio of the DC voltage $V_B$ of the battery to the voltage ($V_L$) output to the load, and satisfies [Formula 2]:

$$\text{buck gain } d_{buck}=V_L/V_B, \qquad \text{[Formula 2]},$$

wherein, $0<V_L/V_B<1$.

Preferably, the first buck calculator may calculate the prediction current $I_{L3}^*$ of the output coil based on input current $I_B$, the buck gain $d_{buck}$, and the boost gain $d_{boost}$, and the prediction current $I_{L3}^*$ may satisfy [Formula 3]:

$$I_{L3}^*=I_B^*(1-d_{boost})/d_{buck}, \qquad \text{[Formula 3]}.$$

Preferably, the buck switching on/off controlling unit may further include a buck NAND gate supplying an inversion signal of an output signal of a third buck limiter to the lower switching element of the buck converter unit.

Preferably, the control device may further include a boost compensation unit provided in a front end of the boost switching on/off controlling unit and compensating the command current based on the command current and the buck gain.

Preferably, the boost compensation unit may include: a multiplier deriving the prediction current by multiplying the command current and the calculated buck gain; a third subtractor deriving error current between the prediction current of the multiplier and the command current; an absolute value calculator deriving an absolute value of the error current of the first subtractor; and a fourth subtractor calculating a difference between the absolute value of the absolute value calculator and the input current, and transferring the same to the amplifying unit.

Preferably, the buck switching on/off controlling unit may be provided in a front end of the buck control module, and further may include a buck compensation unit compensating the prediction current of the buck switching on/off controlling unit in the buck mode based on the voltage output to the load and the DC voltage of the battery, and the command current. Preferably, the buck compensation unit may further include: a voltage compensation module deriving a voltage compensation value for voltage compensation based on a difference between the voltage output to the load and the DC voltage of the battery; a current compensation module deriving a current compensation value for current compensation based on the input current of the battery and the command current; and a prediction current compensation module compensating the prediction current by adding the voltage compensation value, the current compensation value, and the prediction current.

Preferably, the voltage compensation module may include: a second buck subtractor deriving an error between the voltage output to the load and the DC voltage of the battery; a buck proportional controller performing integral control for the error of the second buck subtractor; and a second buck limiter generating the current compensation value for shaping an output signal of the buck proportional controller. Preferably, the current compensation module may further include: a third buck subtractor deriving an error between the command current and the input current of the battery; and a second buck controller generating the voltage compensation value by performing integral-proportional control for the error of the third buck subtractor. Preferably, the prediction current compensation module may include a second buck adder adding the prediction current, the first compensation value, and the second compensation value, and transferring the same to the first buck subtractor.

Preferably, in the boost mode, the first gate signal of the boost switching on/off controlling unit may be applied to respective gate terminals of the upper switching element and the lower switching element of the boost converter unit in a PWM form, and thus the boost converter unit being provided with the DC power of the battery may transfer power that is stepped up according to magnetic flux generated in the coil to the link unit, and in the buck mode, the third gate signal of the buck switching on/off controlling unit may be applied to respective gate terminals of the upper switching element and the lower switching element of the buck converter unit in a PWM form, and thus the DC link voltage of the link unit which has become an overvoltage may be stepped down by the upper switching element and the lower switching element of the buck converter unit and transferred to the rectifying unit.

Advantageous Effects

According to the present invention, a number of switching elements of the buck-boost converter is reduced compared with a conventional buck-boost converter, and thus a buck mode and a boost mode can be performed while the entire conduction loss and switching loss are reduced. In addition, by providing a structure where a two-phase interleaving boost converter unit and a single phase buck converter unit are connected, stepping up and down of an input voltage having a wide range can be available. In addition, a structure becomes simple since one controller controls stepping up and down, and thus a buck-boost converter with low manufacturing cost and a high degree of circuit integration can be implemented.

In addition, the control device is provided with a structure to connect the two-phase interleaving boost converter unit and the single phase buck converter, and a gate signal for an upper switching element of a buck converter unit is generated by command current input to the buck mode in a buck mode, and thus a saturation speed of the upper switching element can be improved in a buck mode and a response speed of switching control can be improved.

Meanwhile, the control device is provided with a structure to connect the two-phase interleaving boost converter unit and the single phase buck converter unit, and further includes a boost compensation unit compensating a gate signal of the boost converter unit to be saturated to a 0V level in the boost buck converter during a buck mode, and a buck compensation unit compensating a gate signal of the buck converter unit to be saturated to a predetermined potential level in a boost mode. Accordingly, saturation speeds of the respective lower switching element of the boost converter unit and the upper switching element of the buck converter unit can be improved, and thus a response speed of switching control can be improved.

DESCRIPTION OF DRAWINGS

The accompanying drawings illustrate a preferred embodiment according to the present invention, and together with the detailed description of the present invention, serve to provide further explanation of the principles of the invention. It should be understood that the present invention is not limited to the following embodiments.

BEST MODE

Figure 1:
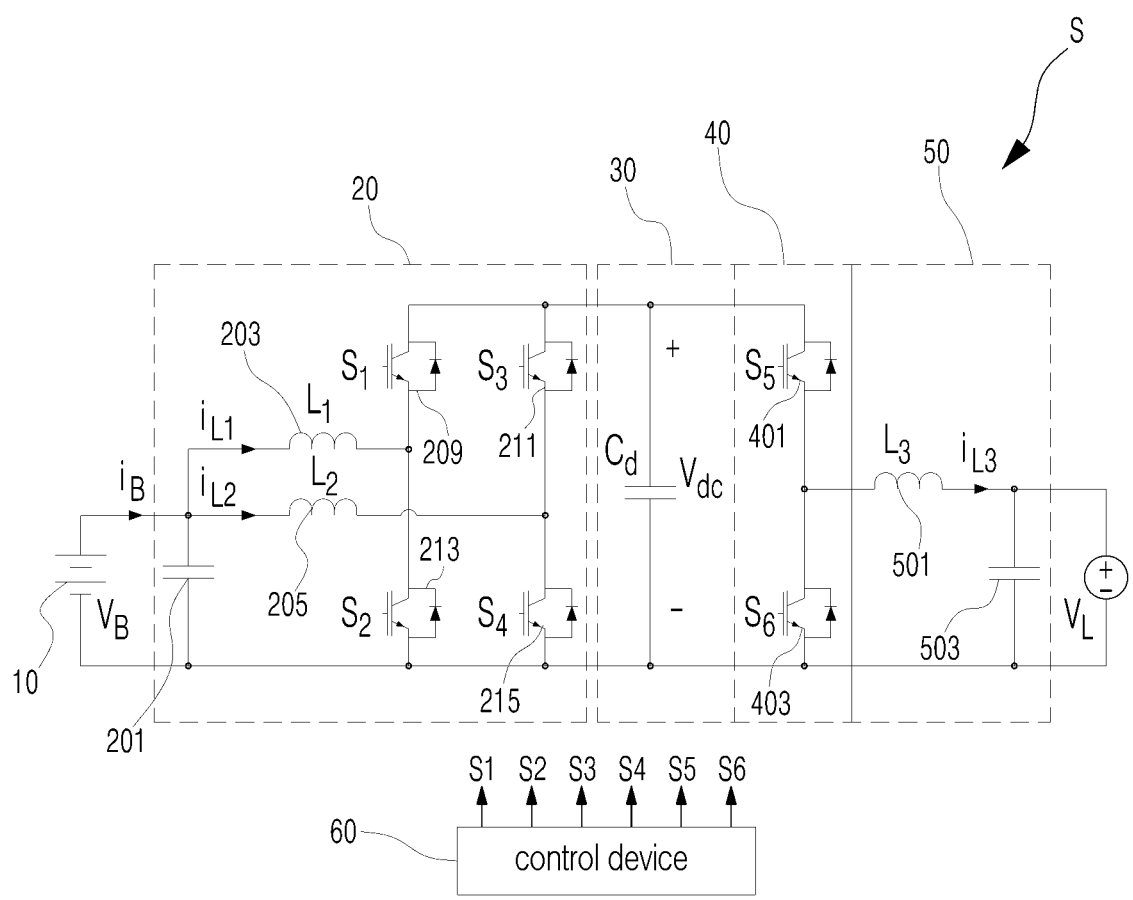
FIG. 1 is a view showing a configuration of a buck-boost converter according to an embodiment the present invention.

Hereinafter, an apparatus and a method for processing a glass substrate according to an embodiment of the present invention will be described in detail with reference to the accompanying drawings.

As embodiments allows for various changes and numerous embodiments, exemplary embodiments will be illustrated in the drawings and described in detail in the written description. However, this is not intended to limit embodiments to particular modes of practice, and it is to be appreciated that all changes, equivalents, and substitutes that do not depart from the spirit and technical scope of embodiments are encompassed in embodiments.

In describing each drawing, like reference numerals refer to like elements. In the accompanying drawings, the sizes of structures are enlarged compared with the actual sizes of the structures for clearness of the present invention.

Terms such as first or second may be used to describe various components but the components are not limited by the above terminologies. The above terminologies are used only to discriminate one component from the other component. For example, without departing from the scope of the present invention, a first component may be referred to as a second component, and similarly, a second component may be referred to as a first component.

Terms used in the present application are used only to describe specific exemplary embodiments, and are not intended to limit the present invention. Singular expressions used herein include plural expressions unless they have definitely opposite meanings in the context. In the present application, it should be understood that term "include" indicates that a feature, a number, a step, an operation, a component, a part or the combination thereof described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art, and are not interpreted as an ideally or excessively formal meaning unless clearly defined in the present invention.

Hereinafter, a buck-boost converter according to an embodiment of the present invention will be described in detail with reference to the accompanying drawings.

FIG. 1 is a view showing a configuration of a buck-boost converter according to the present invention. Referring to FIG. 1, a buck-boost converter S according to an embodiment of the present invention may include a battery 10, a boost converter unit 20 having in a two-phase interleaving structure and stepping up DC power provided from the battery 10, a link unit 30 providing a DC link to an output of the boost converter unit 20, and a rectifying unit 50 rectifying the a DC voltage of the link unit 30 and transferring the same to a load. In addition, the buck-boost converter S may further include a buck converter unit 40 having a single phase structure, stepping down DC link voltage, and transferring the same to the load via the rectifying unit 50.

In addition, the buck-boost converter S may further include a control device 60 controlling switching of the boost converter unit 20 and the buck converter unit 40.

Herein, the boost converter unit 20 is formed with two terminals, and a first end thereof is connected to the battery 10, and a second end of the boost converter unit 20 is connected to the link unit 30 so as to receive DC power of the battery 10.

The boost converter unit 20 is configured with a capacitor 201, at least one first input coil 203 for stepping up DC power of the battery 10 via the capacitor 201 to which the DC power of the battery 10 is applied, and a second input coil 205. Herein, first ends of the first input coil 203 and the second input coil 205 may be connected to the capacitor 201.

In addition, second ends of the first input coil 203 and the second input coil 205 may include at least one switching element 207 for passing DC power that has been stepped up by the first input coil 203 and the second input coil 205. The at least one switching element 207 may be classified into upper switching elements 209 and 211 connected to the second ends of the first input coil 203 and the second input coil 205, and to the first end of the link unit 30, and lower switching elements 213 and 215 connected to the second ends of the first input coil 203 and the second input coil 205, and to a second end of the capacitor 201. A diode for freewheeling may be included in both ends of the upper switching elements 209, 211, 213, and 215.

In detail, first ends of the upper switching elements 209 and 211 may be respectively connected to the second ends of the first input coil 203 and the second input coil 205, and second ends of the upper switching elements 209 and 211 may be shared with the first end of the link unit 30. First ends of the lower switching elements 213 and 215 may be connected to the second ends of the coils 203 and 205, and second ends of the lower switching elements 213 and 215 may be connected to the second end of the link unit 30 and connected to a negative pole of the battery 10

Accordingly, in a boost mode, DC power stepped up by the first input coil 203 and the second input coil 205 may be applied to the link unit 30 via the upper switching elements 209 and 211 and the lower switching elements 213 and 215.

Herein, a boost mode means a state where the boost converter unit 20 steps up a DC voltage $V_B$ of the battery which is applied from the battery 10, and the stepped up voltage is transferred to the load via the link unit 30. Herein, a DC link voltage $V_{dc}$ of the link unit 30 is identical to a voltage $V_L$ of the load. A buck mode means a state where the buck converter unit 40 steps down the DC link voltage of the link unit 30 when the DC link voltage is greater than a predetermined reference voltage so that the DC link voltage of the link unit 30 becomes the DC voltage $V_B$ of the battery.

Herein, the link unit 30 is configured with a capacitor, the first end of the link unit 30 is connected to the second ends of the upper switching elements 209 and 211, and the second end of the link unit 30 is connected to the second ends of the lower switching elements 213 and 215 so as to receive the DC power stepped up by the first input coil 203 and the second input coil 205 via the at least one switching element 207. Accordingly, the link unit 30 may receive the DC power stepped up by the first input coil 203 and the second input coil 205, and the DC power may be provided to the load by sequentially passing the buck converter unit 40 and the rectifying unit 50.

Meanwhile, in a boost mode, the buck converter unit 40 may be configured to be connected between the first end and the second end of the link unit 30, so that the DC link voltage of the link unit 30 may be transferred to the rectifying unit 50, and in a buck mode, the buck converter unit 40 may be configured to step down the DC link voltage of the link unit 30.

In detail, the buck converter unit 40 may include an upper switching element 401 connected to the first end of the link unit 30, and a lower switching element 403 connected to the second end of the link unit 30, and a second end of the upper switching element 401 may be shared with a first end of the lower switching element 403. In addition, a diode for freewheeling may be included in both ends of the respective upper switching element 401 and the lower switching element 403.

In other words, the first end of the upper switching element 401 may be connected to the first end of the link unit 30, and the second end of the upper switching element may be connected to a first end of the rectifying unit 50, the first end of the lower switching element 403 may be connected to the second end of the upper switching element 401, and the second end of the lower switching element 403 may be connected to the second end of the link unit 30.

Accordingly, in a boost mode, the DC link voltage of the link unit 30 may be applied to the rectifying unit 50 via the upper switching element 40, and in a buck mode, the DC link voltage of the link unit 30 may be stepped down by the upper switching element 401 and the lower switching element 403.

In other words, the DC link voltage of the link unit 30 which has become overpower may be transferred to the rectifying unit 50 by being stepped down by the upper switching element 401 and the lower switching element 403. Herein, the DC link voltage tery 10.

Meanwhile, the rectifying unit 50 may be connected to the second end of the upper switching element 401 of the buck converter unit 40, and to the first end of the lower switching element 403 so that the DC link voltage of the link unit 30 may be applied to the rectifying unit 50 via the buck converter unit 40.

The rectifying unit 50 may include a coil 501 rectifying the DC power of the link unit 30 which is transferred via the buck converter unit 40, and a capacitor 503, and smooth power of the capacitor 503 may be provided to the load.

The control device 60 may be configured with a gate driver or a micro control device (MCU). Accordingly, the control device 60 may be configured to control switching operation of the switching elements 201, 211, 213, and 215 of the boost converter unit 20 and the switching elements 401 and 403 of the buck converter unit 40 on the basis of a gain control value according to power applied to the load, current flowing in the first input coil 203 and current flowing in the second input coil 205, and a preset step up and down duty.

Accordingly, the control device 60 may include a voltage compensation device compensating an error between a voltage of the load and a reference voltage, and at least one current compensation device compensating current flowing in the respective first input coil 203 and the second input coil 205.

Operation of the voltage compensation device compensating an error between a voltage of the load and a reference voltage which measures an error between a target voltage and a detected voltage, amplifies the error voltage, and transfers the same to a current control unit is identical or similar to a general voltage compensation device, and thus it will be understood by those of ordinary skill in the art having knowledge of the embodiments of the present invention.

Figure 2:
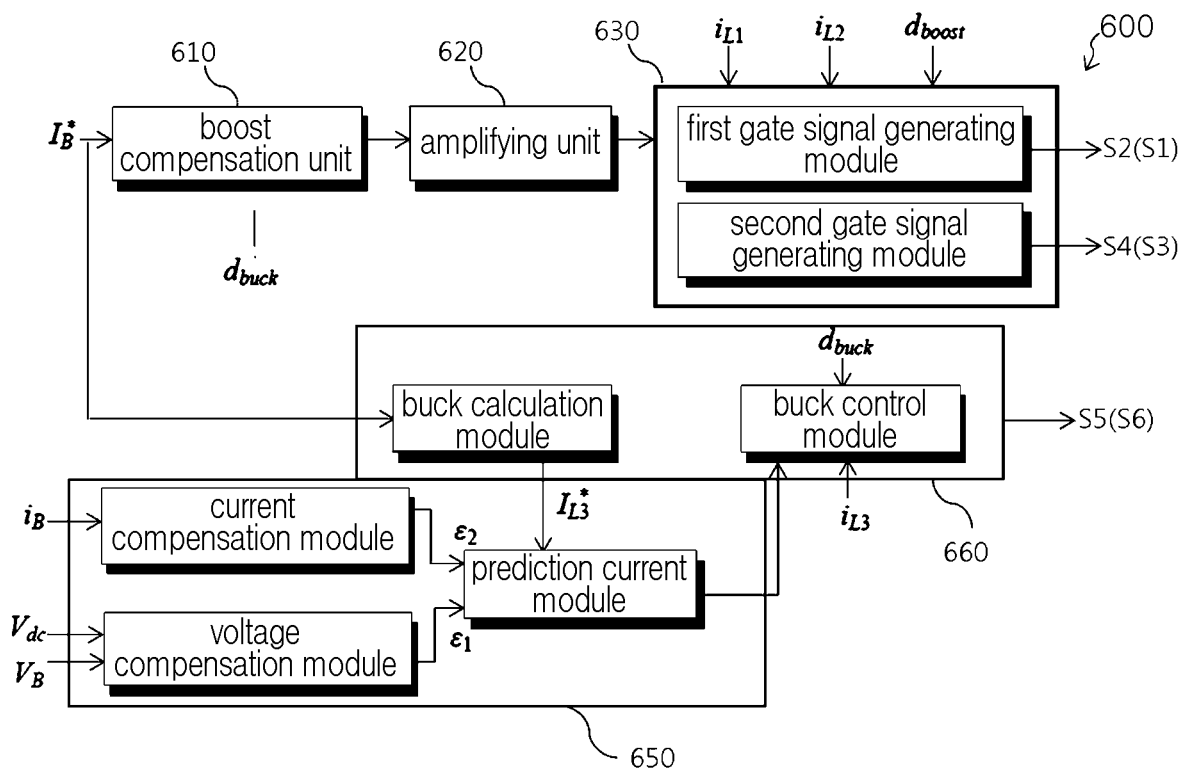
FIG. 2 is a view of a block diagram showing a configuration of a current control unit of a buck-boost converter according to an embodiment the present invention.
Figure 3:
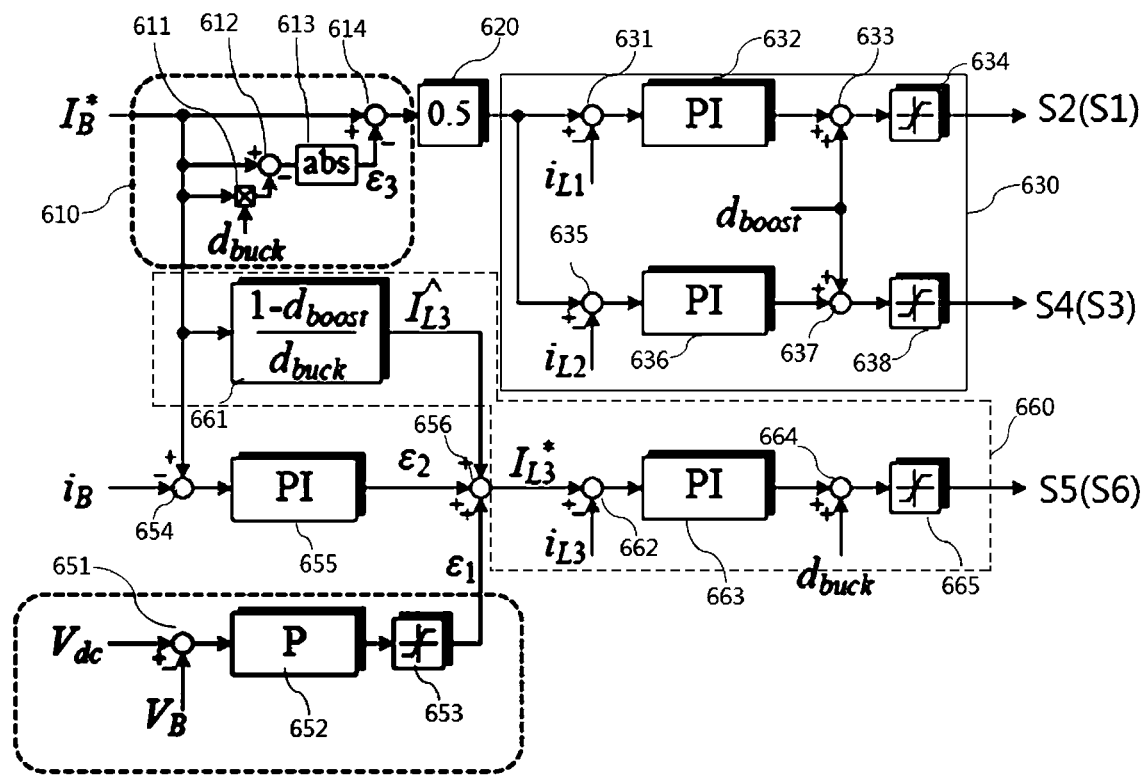
FIG. 3 is a view of a detailed circuit diagram of a current control unit of a buck-boost converter according to an embodiment the present.
Figure 4:
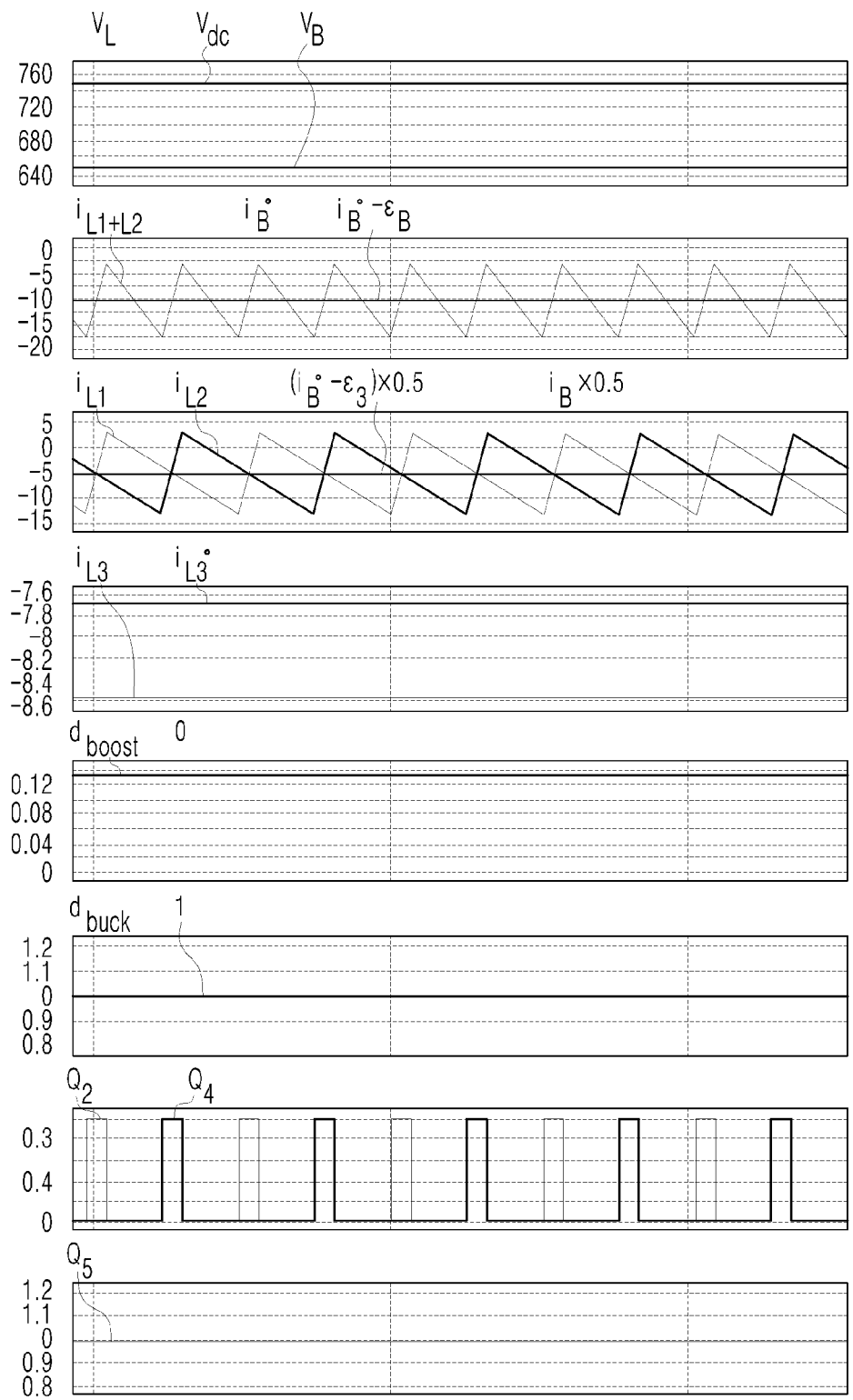
FIG. 4 is a view of a waveform diagram of a current control unit when a buck-boost converter operates in a boost mode according to an embodiment the present.
Figure 5:
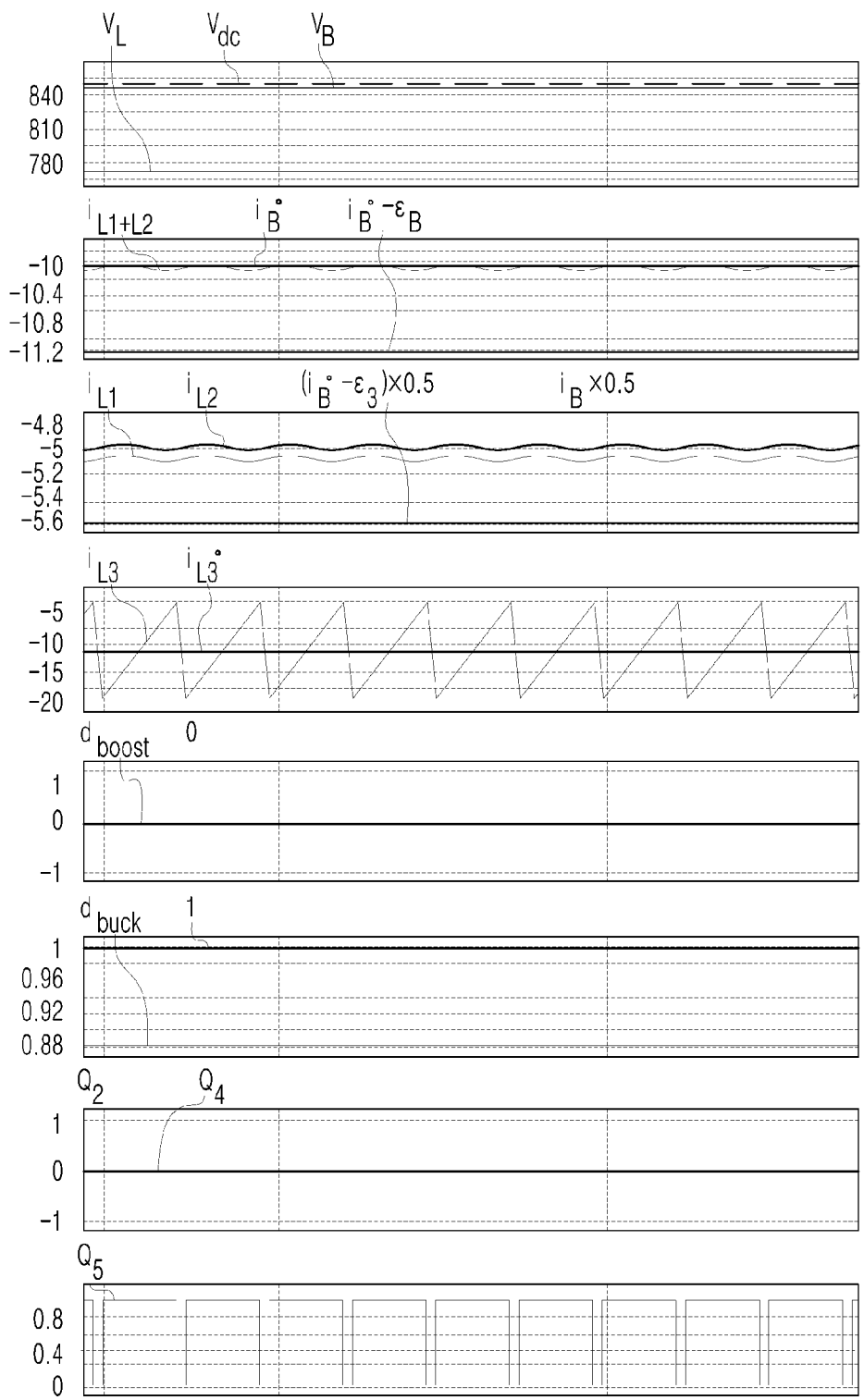
FIG. 5 is a view of a waveform diagram of each part for describing mode switching of a current control unit when a buck-boost converter operates in a buck mode according to an embodiment the present.

Meanwhile, FIG. 2 is a view of a block diagram showing a detailed configuration of a current control unit of the control device 60, FIG. 3 is a view of a detailed circuit diagram of the current control unit of FIG. 2, and FIGS. 4 and 5 are views showing output waveforms of each part shown in FIG. 3.

Referring to FIGS. 2 to 5, the current control unit may be configured to generate a second gate signal S2 and a fourth gate signal S4 for the lower switching elements 213 and 215 of the buck-boost converter and the boost converter unit 20, and generate a third gate signal S5 for the upper switching element 401 of the buck converter unit 40 during a buck mode.

The current control unit shown in FIGS. 2 to 5 is an uninterruptable power example for stably providing DC current of a battery to a load, and configuration components related to the present embodiment are shown. Accordingly, it will be understood by those skilled in the art that other general components may be included in addition to the configuration components shown in FIGS. 2 to 5.

Herein, the current control unit derives a command voltage $V_B^*$ and command current $I_B^*$ on the basis of a gain control value set according to an output voltage applied to the load, current flowing in the first input coil 203 and the second input coil 205, and a preset step up and down duty, and generates gate signals S1 to S6 for controlling switching operation of the upper switching elements 209 and 211 and the lower switching elements 213 and 215 of the boost converter unit 20, and the upper switching element 401 and the lower switching element 403 of the buck converter unit 40 on the basis of the derived command voltage $V_B^*$ and the command current $I_B^*$.

Accordingly, in a boost mode, switching operation of the lower switching element 213 is performed by a gate signal S2, switching operation of the lower switching element 215 is performed by a gate signal S4, and switching operation of the upper switching elements 209 and 211 are respectively complementarily performed by switching operation of the lower switching elements 213 and 215.

In addition, in a buck mode, switching operation of the upper switching element 401 is performed by a gate signal S5. Herein, switching operation of the lower switching element 403 is complementarily performed by switching operation of the switching element 401.

Accordingly, the current control unit may compensate current flowing in the respective first input coil 203, the second input coil 205, and the output coil 501.

The current control unit includes a boost compensation unit 610, an amplifying unit 620, a boost switching on/off controlling unit 630, a buck compensation unit 650, and a buck switching on/off controlling unit 660.

The boost compensation unit 610 is configured with a subtractor 612 connected to an output of a multiplier 611 performing calculation by receiving the command current $I_B^*$ and a buck gain $d_{BUCK}$, an absolute value calculator 613 connected to an output of the subtractor 612, and a subtractor 614 connected to an output of the absolute value calculator 613.

Accordingly, in order to compensate the command current $I_B^*$ by receiving the command current $I_B^*$ and the buck gain $d_{BUCK}$ in a boost mode, the multiplier 611 multiplies the command current $I_B^*$ and the buck gain $d_{BUCK}$, and transfers the result to the subtractor 612. The subtractor 612 calculates an error between the output current of the multiplier 611 and the command current $I_B^*$, and the error calculated by the subtractor 612 is transferred to the subtractor 614 via the absolute value calculator 613. In other words, the boost compensation unit 610 outputs error current obtained by multiplying the buck gain $d_{BUCK}$ and the command current $I_B^*$, calculating the error between the result of the multiplication and the command current $I_B^*$, and by calculating the error between an absolute value of the calculated error and the command current $I_B^*$.

Herein, the buck gain $d_{BUCK}$ is a value calculated by a ratio of DC power $V_B$ of the battery and power $V_L$ output to the load, and satisfies [Formula 1]:

$$\text{buck gain } d_{buck} = V_L/V_B \qquad \text{[Formula 1]},$$

$0 < V_L/V_B < 1$

Error current of the above boost compensation unit 610 is transferred to the amplifying unit 620. Accordingly, the amplifying unit 620 amplifies the error current of the boost compensation unit 610 by using a preset amplifying gain.

In addition, the error current amplified in the boost compensation unit 610 is transferred to the boost switching on/off controlling unit 630.

The boost switching on/off controlling unit 630 includes a first gate signal generating module and a second gate signal generate module. The first gate signal generating module includes a subtractor 631, a controller 632, an adder 633, and a limiter 634, and the second gate signal generating module includes a subtractor 635, a controller 636, an adder 637, and a limiter 638.

In other words, the subtractor 631 of the first gate signal generating module calculates a difference between the error current amplified in the boost compensation unit 610 and current $i_{L1}$ flowing in the first input coil 203, and the calculated difference error current is transferred to the controller 632.

The controller 632 rectifies the error current of the subtractor 631 by performing proportional-integral control for the same, and the output signal rectified in the controller 632 is transferred to the adder 633. The adder 633 adds the output signal of the controller 622 and the boost gain $d_{BOOST}$, and the output signal of the adder 633 is transferred to the limiter 634.

The limiter 634 outputs a first gate signal S2 having a level determined on the basis of a difference between the output signal of the adder 633 and a preset reference signal. For example, in a boost mode, the first gate signal S2 is output in a low level, and thus the lower switching element 213 is switched to a turn-off state.

Meanwhile, the subtractor 635 of the second gate signal generating module calculates a difference between the error current amplified in the boost compensation unit 610 and the current $i_{L1}$ flowing in the first input coil 203, and the error current calculated in the subtractor 635 is transferred to the controller 636.

The controller 636 rectifies the error current of the subtractor 635 by performing proportional-integral control for the same, and the output signal rectified in the controller 636 is transferred to the adder 637. The adder 637 adds the output signal of the controller 635 and the boost gain $d_{BOOST}$, and the output signal of the adder 637 is transferred to the limiter 638.

The limiter 638 outputs a first gate signal S4 having a level determined on the basis of a difference between the output signal of the adder 637 and a preset reference signal. For example, in a boost mode, the first gate signal S4 is output in a low level, and thus the lower switching element 215 is switched to a turn-off state.

Herein, the boost gain $d_{BOOST}$ is a value obtained by subtracting a ratio of the voltage $V_B$ input to the battery to the voltage $V_L$ output to the load from 1, and the boost gain $d_{BOOST}$ satisfies [Formula 2] below:

boost gain $d_{boost}=1-V_B/V_L$     [Formula 2], satisfying $0<V_B/V_L<1$.

Accordingly, the voltage $V_B$ input from the battery is stepped up by the first input coil 203 and the second input coil 205, passes through the upper switching elements 209 and 211 switched to a turn-on state according to a gate signal and which respectively complementarily operate by the first gate signal S2 and the second gate signal S4, and thus is transferred to the link unit 30. The DC link voltage of the link unit 30 transferred to the load via the rectifying unit 50. In addition, NAND gates are further provided for outputting inversion signals of output signals of the respective limiters 634 and 638 as gate signals for the upper switching elements 209 and 211 of the boost converter unit 20. Accordingly, the lower switching elements 213 and 215 which are provided with output signal of the NAND gates are complementarily switched according to switching operation of the upper switching elements 209 and 211.

Meanwhile, the current control unit may further include a buck compensation unit 650 for compensation such that the upper and lower switching elements 401 and 402 of the buck converter unit 40 are saturated to a predetermined potential level (integer excluding zero).

The buck compensation unit 650 includes a voltage compensation module, a current compensation module, and a prediction current compensation module. The voltage compensation module derives a voltage compensation value ε1 for voltage compensation on the basis of a difference between the voltage $V_{dc}$ output to the load and the DC voltage $V_B$ input from the battery.

In addition, the current compensation module derives a current compensation value ε2 for current compensation on the basis of the DC current $i_B$ input from the battery and the command current $i_B^*$, and the prediction current compensation module performs compensation for prediction current by adding the voltage compensation value ε1, the current compensation value ε2, and the prediction current $I_{L3}^*$ of a buck calculation module.

Herein, the voltage compensation module may include a buck adder 651, a buck proportional controller 652, and a buck limiter 653. The buck adder 651 calculates a difference between the voltage $V_{dc}$ output to the load and the DC voltage $V_B$ input from the battery, and the output voltage of the buck adder 651 is transfer to the buck proportional controller 652. The buck proportional controller 652 performs integral control for the output signal of the buck adder 651, and the output signal of the buck proportional controller 652 to which integral control is performed is transferred to the buck limiter 653.

The buck limiter 653 derives a voltage compensation value ε1 on the basis of a comparison result between the output signal of the buck proportional controller 652 and a preset reference signal, and the derived voltage compensation value ε1 is transferred to the prediction current compensation module.

In addition, the current compensation module includes a buck subtractor 654 and a buck controller 655. The buck subtractor 654 derives an error between the command current $i_B^*$ and input current $i_B$ of the battery, and the output current derived in the buck subtractor 654 is transferred to the buck controller 655. The buck controller 655 generates a current compensation value ε2 by performing proportional-integral control for the output current of the buck subtractor 654, and the generated current compensation value ε2 is transferred to the prediction current compensation module.

Accordingly, the prediction current compensation module adds the voltage compensation value ε1, the current compensation value ε2, and prediction current $i_{L3}^*$, and the output current of the prediction current compensation module is transferred to the buck adder 642. Herein, the prediction current $i_{L3}^*$ is derived from a buck calculation module of the buck switching on/off controlling unit 660 which will be described later.

In other words, the buck switching on/off controlling unit 660 includes a buck calculation module and a buck control module. The buck calculation module may include a prediction current calculator 661 and the buck control module may include a buck subtractor 662, a buck controller 663, a buck adder 664, and a buck limiter 665.

The prediction current calculator 661 calculates prediction current $i_{L3}^*$ flowing in the output coil 501 from the command current $i_B^*$ and the boost gain $d_{BOOST}$, and the buck gain $d_{BUCK}$, and the prediction current $i_{L3}^*$ is transferred to the buck subtractor 662.

The buck subtractor 662 generates error current between the prediction current $i_{L3}^*$ of the prediction current calculator 661 and practical current $i_{L3}$ flowing in the output coil 501, and the error current generated in the buck subtractor 662 is transferred to the buck controller 663.

The buck controller 663 rectifies the error current of the buck subtractor 662 by performing proportional-integral control for the same, and the output signal of the buck controller 663 is transferred to the buck adder 664.

The buck adder 664 adds the output signal of the buck controller 663 and the buck gain $d_{BUCK}$, and the output signal of the buck adder 664 is provided to the buck limiter 665. The buck limiter 665 generates a third gate signal S5 to have a level according to a comparison result between the output signal of the buck adder 664 and a predetermined reference signal, and the output signal of the buck limiter 665 is transferred to the upper switching element 401 of the buck converter unit 40. In addition, an NAND gate is further provided for outputting an inversion signal of the output signal of the buck limiter 665 as a gate signal for the upper switching element 401 of the buck converter unit 40.

Accordingly, in a buck mode, the upper switching element 401 and the lower switching element 402 are switched, and thus the DC link voltage of the link unit 30 which has become overpowered equal to or greater than a predetermined reference voltage is stepped down.

Accordingly, in a buck mode, the current control unit compensates a first gate signal S2 and a second gate signal S4 to be saturated to a 0V level by the boost compensation unit 610, and in a boost mode, the current control unit compensates a third gate signal S5 to be saturated to a predetermined potential level (in general, potential level of equal to or greater than 5V).

Referring to FIG. 4, when a voltage $V_B$ of a battery is DC 650V, and a voltage $V_L$ of a load is 750V, output waveforms of respective parts of the current control unit in a boost mode are shown, and referring to FIG. 4, in a boost mode operation from no load to full load, boost gain $D_{boost}=1-V_B/V_L=0.5$, and buck gain $Dbuck=V_L/V_B=1$. Accordingly, input current $i_B$ increases from 0 A to 10 A.

In addition, the lower switching elements 213 and 215 are switched by a first gate signal S2 and a second gate signal S4 which have a predetermined potential level. Herein, the upper switching element 401 of the buck converter unit 40 maintains a turn-on state by a third gate signal S5 having a predetermined potential level. The upper switching elements 209 and 211 the lower switching elements 213 and 215 are switched by gate signals S1 and S3. The lower switching element 403 complementarily operating according to the upper switching element 401 of the buck converter unit 40 maintains a turn-off state by a gate signal of 0V.

Accordingly, the DC voltage input from the battery may be stepped up by the first input coil 203 and the second input coil 205 according to switching operation of the upper switching elements 209, 211, 213, and 215, of the boost converter unit 20, and the DC voltage which is stepped up may be transferred to the link unit 30. In addition, the upper switching element 401 of the buck converter unit 40 may be switched to a turn-on state, a DC link voltage that is provide by the link unit 30 may be transferred to the rectifying unit 50 via the upper switching element 401. The rectifying unit 50 may rectify the DC link voltage, and transfer the same to the load. Herein, the DC link voltage of the link unit 30 is identical to the voltage of the load.

Accordingly, according to the present invention, a response speed in a boost mode from no load to full load is improved according to a switching speed of the lower switching elements 213 and 215, and the upper switching element 401.

In addition, referring to FIG. 5, when a DC voltage VB of the battery is 850V, and a voltage VL of the load is 750V, output waveforms of respective parts of the current control unit in a buck mode are shown. In a buck mode, boost gain Dboost=1−VB/VL=0, and buck gain Dbuck=VL/VB=0.5. Accordingly, input current iB increases from 0 A to 10 A.

In addition, the lower switching elements 213 and 215 of the boost converter unit 20 maintain a turn-off state by a first gate signal S2 and a second gate signal S4 which have a 0V level. Herein, the upper switching elements 209 and 211 complementarily operating according to the lower switching elements 213 and 215 maintain a turn-on state.

Herein, the upper switching element 401 of the buck converter unit 40 is switched by a third gate signal S5 having a predetermined potential level, and the lower switching element 403 complementarily operating according to the upper switching element 401 is also switched. Accordingly, in a buck mode, a DC link voltage of the link unit 30 is stepped down by the upper switching element 401 and the lower switching element 403, and the DC link voltage that has been stepped down is transferred to the load via the rectifying unit 50. Herein, the DC link voltage of the link unit 30 is identical to the DC voltage of the battery 10. Herein, the upper switching element 401 and the lower switching element 403 are complementarily switched.

According to the present invention, in a control device of a boost buck converter which has a structure where a two-phase interleaving boost converter unit and a single phase buck converter unit are connected, in a buck mode, a gate signal for an upper switching element of a buck converter unit is generated according to input command current, and thus a saturation speed of the upper switching element may be improved during a buck mode, and a response speed of switching control may be also improved.

In a boost buck converter having a structure where a two-phase interleaving boost converter unit and a single phase buck converter unit are connected, by adding a boost compensation unit compensating such that gate signals S2 and S4 of the boost converter unit 20 are saturated to a 0V level in a buck mode, and a buck compensation unit compensating such that a gate signal S5 of the buck converter unit 40 is saturated to a predetermined potential level in a boost mode, and which includes a rectify compensation module, a rectify compensation module, and a buck calculation module, switching control is stably performed by excessive saturation states of switching elements of the boost converter unit 20 and the buck converter unit 40 when the same operate from no load to full load, and thus a response speed is improved The boost converter S that is provided with gate signals S1 to S6 described above operates in a boost mode and a buck mode.

In other words, in a boost mode, a PWM control signal of the boost switching on/off controlling unit 630 may be applied to a gate terminal of the respective upper switching elements 209 and 211 and the lower switching elements 213 and 215 of the boost converter unit 20. Accordingly, power that is stepped up by magnetic flux generated in the first input coil 203 and the second input coil 205 of the boost converter unit 20 that is provided with DC power of the battery 10 may be transferred to the link unit 30. Herein, the upper switching element 209 and the lower switching element 213 are complementarily switched, and the upper switching element 211 and the lower switching element 215 are also complementarily switched.

Meanwhile, in a buck mode, a PWM control signal of the buck switching on/off controlling unit 660 may be applied to a gate terminal of the respective upper switching element 401 and the lower switching element 403 of the buck converter unit 40. Accordingly, DC link voltage of the link unit 30 which has become an overvoltage is stepped down by the upper switching element 401 and the lower switching element 403 of the buck converter unit 40, and the DC link voltage that has been stepped down may be applied to the rectifying unit 50. Herein, the upper switching element 401 and the lower switching element 403 may be complementarily switched.

Figure 6:
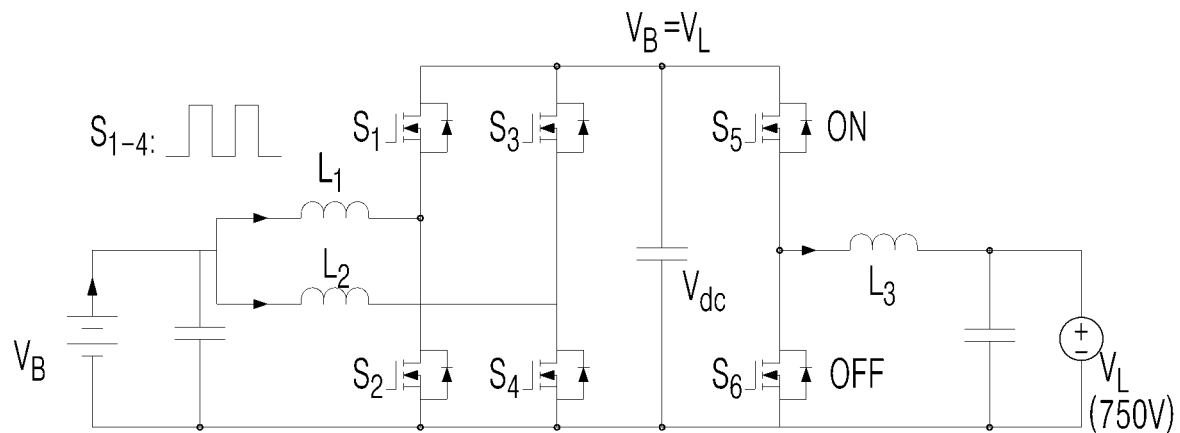
FIG. 6 is a view showing a boost mode of a buck-boost converter according to an embodiment the present.

FIG. 6 is a view of a circuit diagram showing a boost mode of the buck-boost converter S shown in FIG. 1. Referring to FIG. 6, in a boost mode, DC power of the battery 10 may be stepped up by the boost converter unit 20 by being transferred to the first input coil 203 and the second input coil 205 via the capacitor 201.

In addition, according to switching operation of the upper switching elements 209 and 211 and the lower switching elements 213 and 215 of the boost converter unit 20 which have received gate signals S1 to S4 of a PWM form provided from the control device 60, the DC power of the battery 10 which has been stepped up by the first input coil 203 and the second input coil 205 may be transferred to the link unit 30.

Herein, as the upper switching element 401 of the buck converter unit 40 is switched to a turn-on state according to a gate signal S5 of the control device 60, DC link voltage provided by the link unit 30 may be transferred to the rectifying unit 50 via the upper switching element 401. The rectifying unit 50 may rectifies the DC link voltage and transfer the same to the load. Herein, the DC link voltage of the link unit 30 is identical to power provided to the load.

Figure 7:
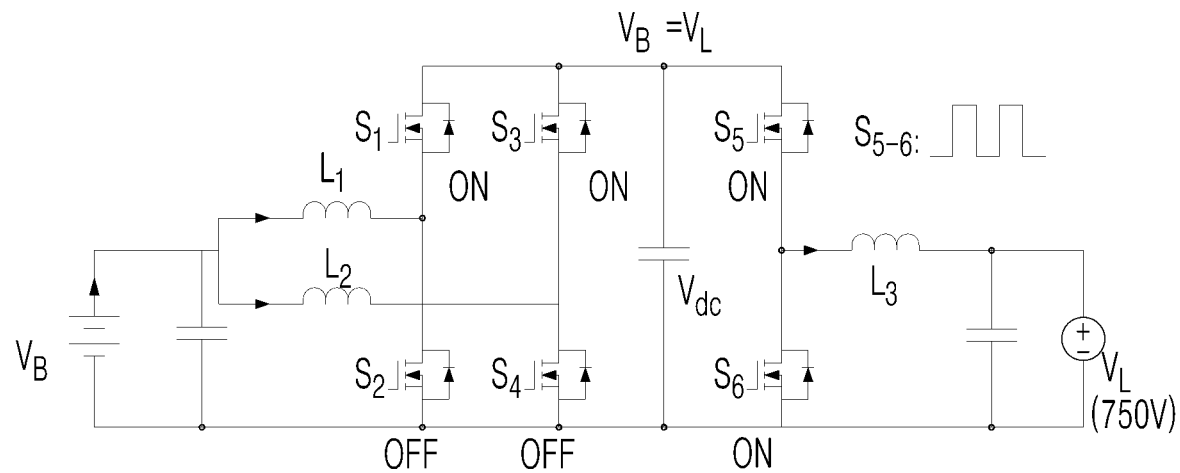
FIG. 7 is a view showing a buck mode of a buck-boost converter according to an embodiment the present.

FIG. 7 is a view of a circuit diagram showing a buck mode of the buck-boost converter S shown in FIG. 1. Referring to FIG. 7, in a buck mode, the upper switching elements 209 and 211 of the boost converter unit 20 are switched to a turn-on state according to gate signals S1 and S3 of the control device 60, and the upper switching element 401 and the lower switching element 403 of the buck converter unit 40 are switched to a turn-on state by gate signals S5 and S6. In detail, herein, the upper switching element 209 and the lower switching element 213 are complementarily switched, and the upper switching element 211 and the lower switching element 215 are also complementarily switched.

In addition, in a buck mode, DC link voltage of the link unit 30 may be stepped down by the upper switching element 401 and the lower switching element 403, and the DC link voltage that has been stepped down may be transferred to the load via the rectifying unit 50. Herein, the DC link voltage of the link unit 30 is identical to DC power of the battery 10. Herein, the upper switching element 401 and the lower switching element 403 are complementarily switched.

Figure 8A:
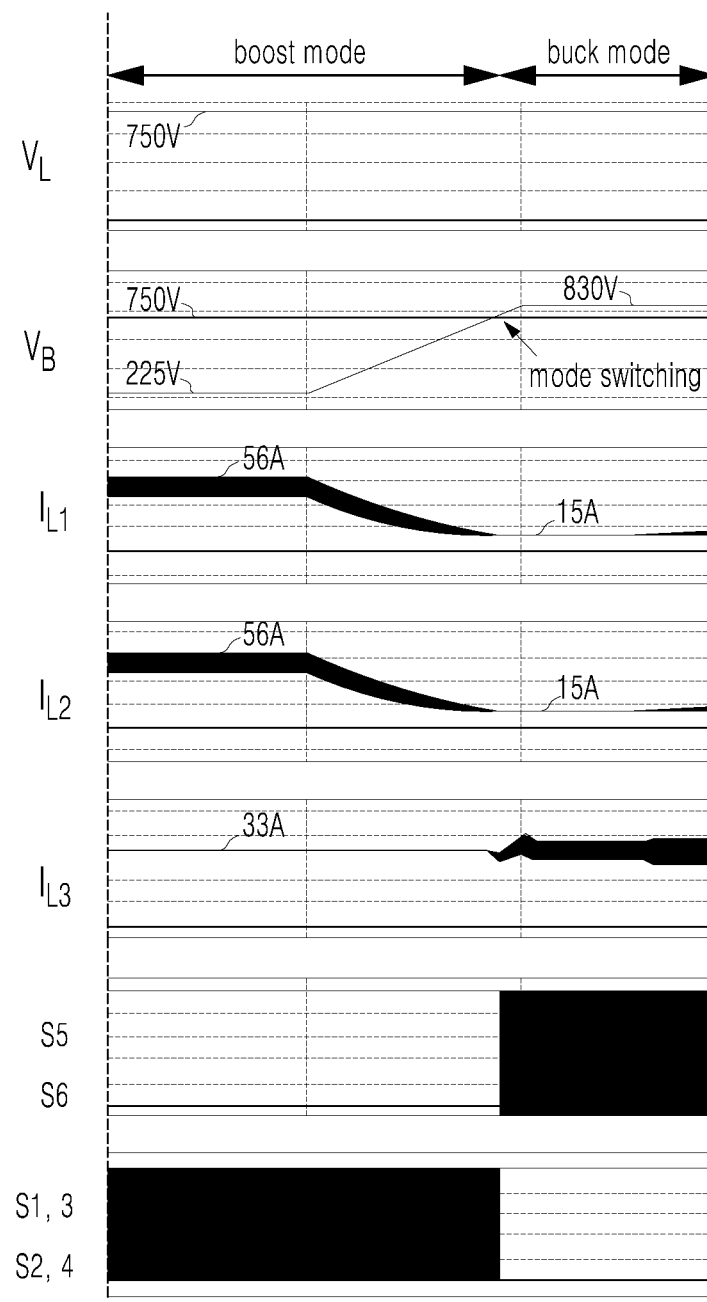
FIG. 8a to FIG. 8c are views showing voltage and current waveforms of each part of a buck-boost converter according to an embodiment the present.
Figure 8B:
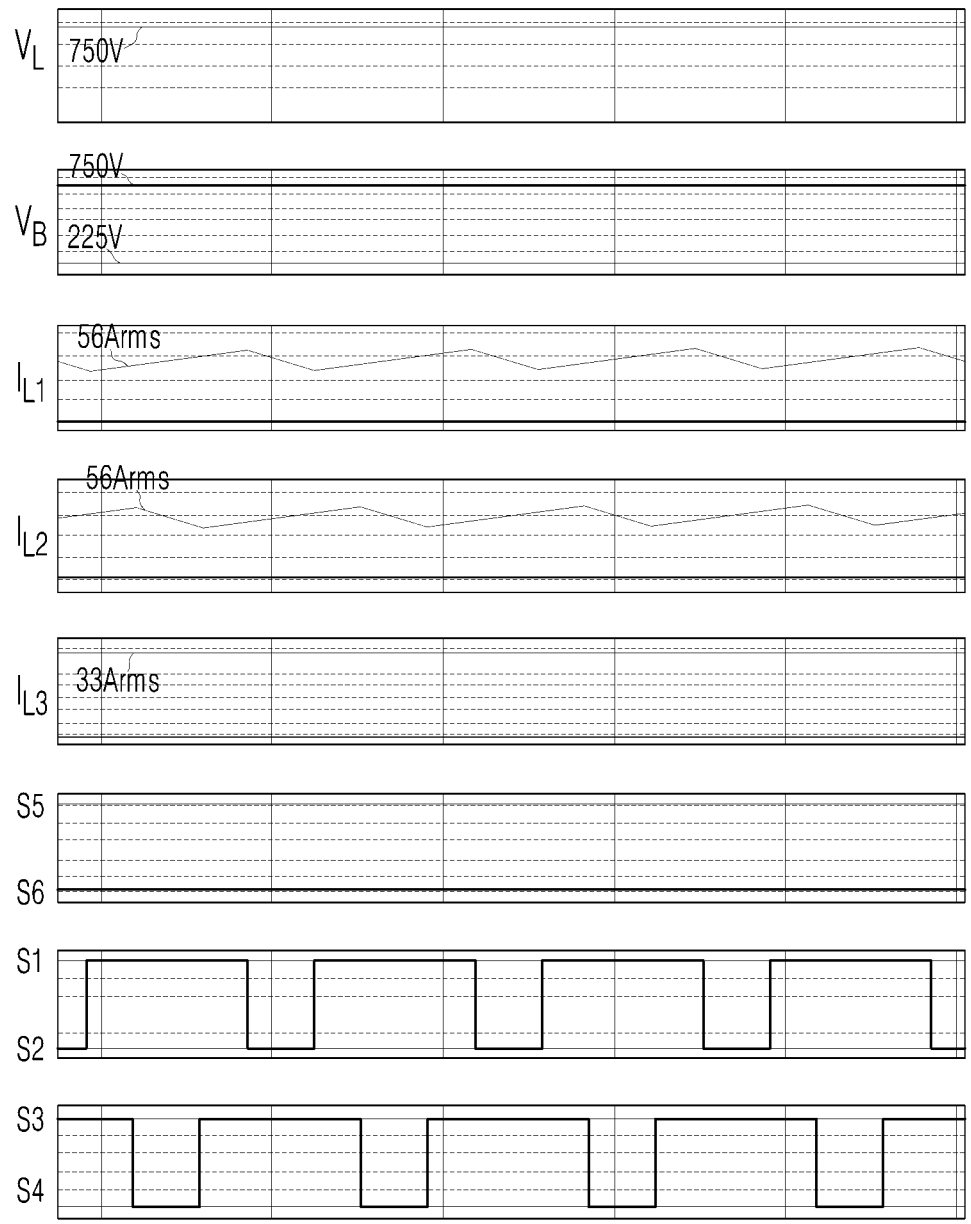
Figure 8C:
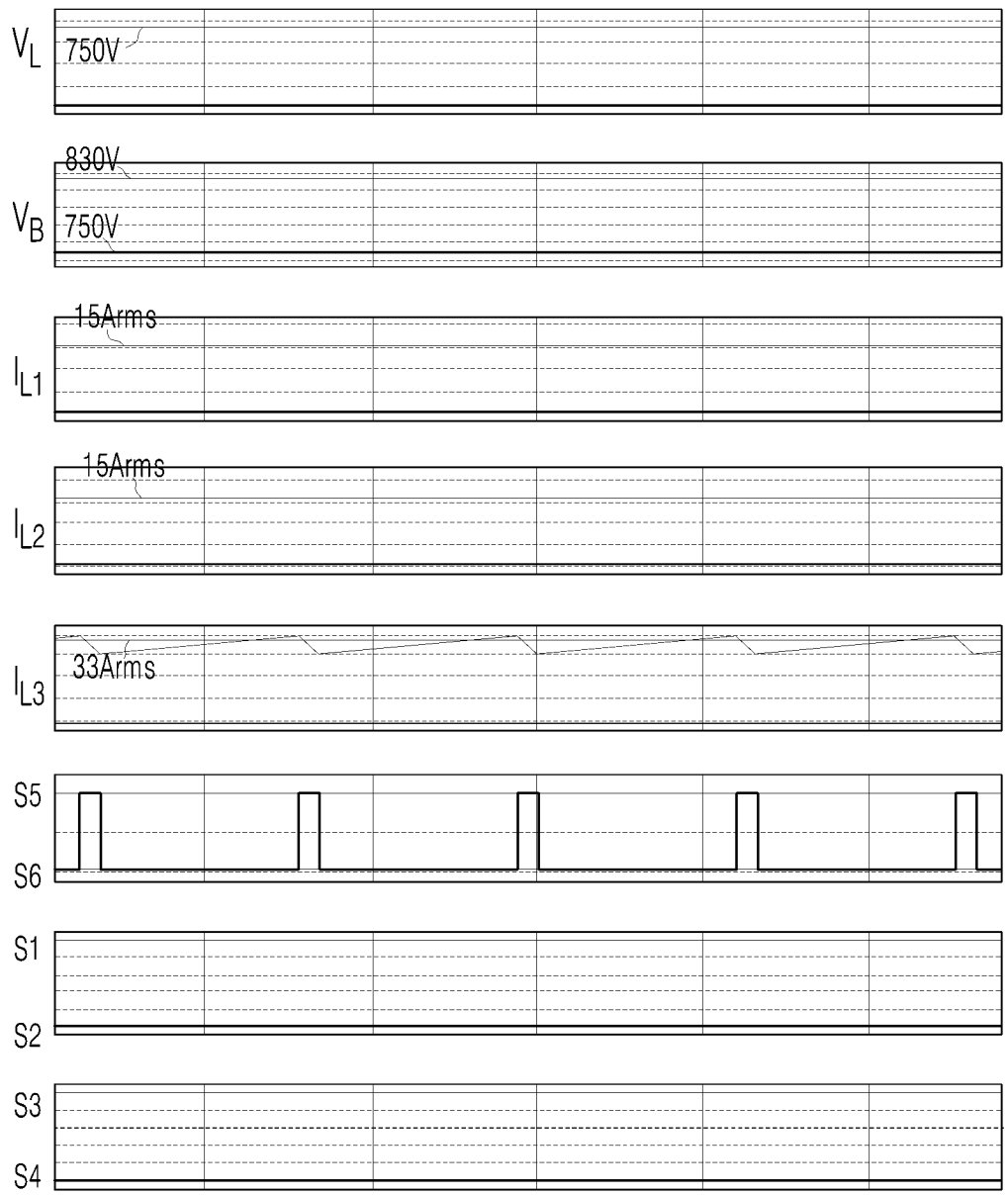

FIGS. 8a to 8c are views showing voltage and current waveforms of each unit of the buck-boost converter S shown in FIG. 1. Referring to FIG. 8a, in a boost mode, it may be confirmed that power provided to the load in a boost mode is identically stepped up to DC power of the battery 10, current amounts respectively flowing in the first input coil 203 and the second input coil 205 of the boost converter unit 20 identically decrease, and current flowing in the coil 501 of the rectifying unit 50 is constant. In addition, in a buck mode, power provided to the load may be maintained to be constant to a value identical to DC power of the battery 10.

As shown in FIG. 8b, in a boost mode, it may be confirmed that the upper switching element 209 and the lower switching element 213 are complementarily switched, and the upper switching element 211 and the lower switching element 215 are also complementarily switched. As shown in FIG. 8c, in a buck mode, it may be confirmed that the upper switching element 401 and the lower switching element 403 are also complementarily switched.

Figure 9A:
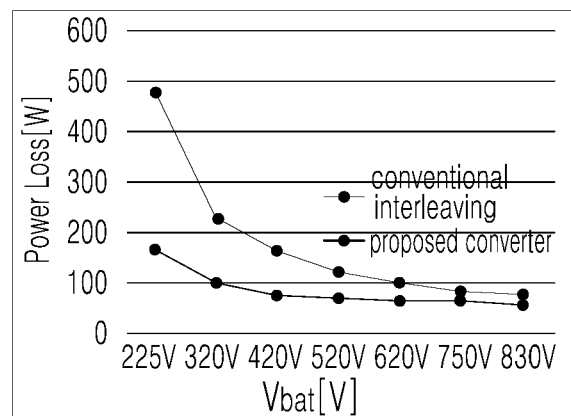
FIGS. 9a and 9b are views showing amounts of power loss of a buck-boost converter according to an embodiment the present.
Figure 9B:
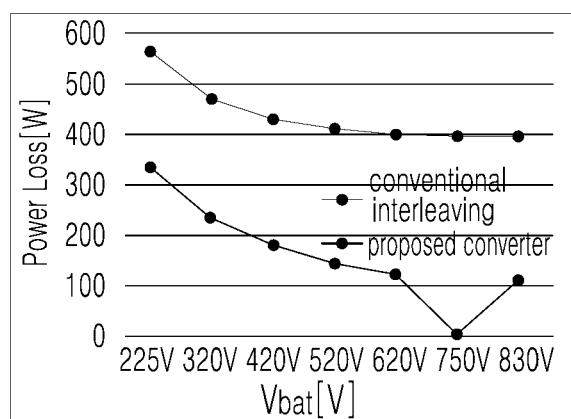

FIGS. 9a and 9b are views showing amounts of power loss of the buck-boost converter S shown in FIG. 1. Referring to FIGS. 9a and 9b, compared with a conventional buck-boost converter, it may be confirmed that a number of switching elements of the present inventions is reduced, conduction loss is reduces as current flowing in the switching elements decreases, and switching loss of each switching element is reduced.

Accordingly, according to the present invention, a number of switching elements of a buck-boost converter decreases compared with a conventional buck-boost converter, and thus a buck mode and a boost mode are performed while the entire conduction loss and switching loss are reduced. In addition, by providing a structure where a two-phase interleaving boost converter unit and a single phase buck converter unit are connected, stepping up and down of an input voltage having a wide range is available. In addition, a structure becomes simple since one controller controls stepping up and down, and thus a buck-boost converter with low manufacturing cost and high degree of circuit integration may be implemented.

Although the disclosure has been described with reference to specific embodiments, it will be understood by those skilled in the art that various changes may be made without departing from the spirit or scope of the disclosure. Thus, it is intended that the present disclosure covers all such modifications provided they come within the scope of the appended claims and their equivalents.

INDUSTRIAL APPLICABILITY

A number of switching elements of a buck-boost converter decreases compared with a conventional buck-boost converter, and thus a buck mode and a boost mode are performed while the entire conduction loss and switching loss are reduced. In addition, by providing a structure where a two-phase interleaving boost converter unit and a single phase buck converter unit are connected, stepping up and down of an input voltage having a wide range is available. In addition, a structure becomes simple since one controller controls stepping up and down, and thus a buck-boost converter with low manufacturing cost and high degree of circuit integration may be implemented. Accordingly, the present invention can bring a great advancement in terms of accuracy and reliability on operation of a buck-boost converter, and performance efficiency further. The present invention is an invention that has industrial applicability since the present invention is sufficient for market or sales opportunities of power supply devices of small scale power sources, and is practically possible to carry out clearly.

What is claimed is:
1. A buck-boost converter, the converter comprising:
a battery;
a boost converter unit stepping up DC power supplied from the battery, the boost converter unit including at least one coil for stepping up the DC power supplied from the battery;
a link unit providing a DC link for the stepped up DC power to a load;
a rectifying unit rectifying the DC link voltage of the link unit and transferring the DC link voltage to the load;

a buck converter unit having a single phase stepping down the DC link voltage, and transferring the DC link voltage to the load through the rectifying unit; and a control device controlling switching of the boost converter unit and the buck converter unit;

wherein the control device includes;

an amplifying unit amplifying command current of the battery by using a predetermined gain;

a first gate signal generating module outputting a first gate signal for controlling switching of the boost converter unit by deriving an error between a practical current flowing in a first input coil of the at least one coil stepping up the DC power supplied from the battery, and the amplified command current, and by shaping the derived error; and a second gate signal generating module outputting a second gate signal for controlling switching of the boost converter unit by shaping an error between a practical current flowing in a second input coil of the at least one coil stepping up the DC power supplied from the battery and being connected to the first input coil in parallel, and the amplified command current, wherein the first gate signal generating module includes:

a first subtractor calculating the error between a practical current of the first input coil and the amplified command current;

a first controller performing proportional-integral control for the error of the first subtractor;

a first adder adding a boost gain calculated from a voltage input from the battery and a voltage output to the load, and an output signal of the first controller; and a first limiter generating a first gate signal by shaping an output signal of the first adder, and transferring the first gate signal to the lower switching element of the boost converter unit.

2. The buck-boost converter of claim of 1, wherein the first gate signal generating module further includes a NAND gate transferring an inversion signal of an output signal of the first limiter to the upper switching element of the boost converter unit.

3. The buck-boost converter of claim 2, wherein the boost gain ($d_{boost}$) is derived by subtracting a ratio of the voltage ($V_B$) input from the battery to the voltage($V_L$) output to the load from 1, and satisfies [Formula 1]:

$$\text{boost gain } (d_{boost})=1-V_B/V_L \qquad \text{[Formula 1]},$$

wherein, $0<V_B/V_L<1$.

4. The buck-boost converter of claim 3, wherein the second gate signal generating module includes:

a second subtractor calculating the error between the practical current of the second input coil and the amplified command current;

a second controller performing proportional-integral control for an error generated in the second subtractor;

a second adder adding the boost gain and an output signal of the second controller; and a second limiter generating the second gate signal by shaping an output signal of the second adder, and transferring the generated second gate signal to the lower switching element of the boost converter unit.

5. The buck-boost converter of claim of 4, wherein the second gate signal generating module further includes a NAND gate transferring an inverse signal of an output signal of the second limiter to the upper switching element of the boost converter unit.

6. The buck-boost converter of claim 5, wherein the buck switching on/off controlling unit includes:

a buck calculation module predicting current flowing in the output coil based on the buck gain calculated from the command current, the boost gain, and the voltage input from the battery and the voltage output to the load; and a buck control module generating a third gate signal for controlling switching of the upper switching element and the lower switching element of the buck converter unit in the buck mode based on the current predicted in the buck calculation module.

7. The buck-boost converter of claim 6, wherein the buck control module includes:

a first buck subtractor calculating an error between the predicted current of the buck calculation module and a practical current flowing in the output coil;

a first buck controller performing proportional-integral control for an error current of the first buck subtractor;

a first buck adder adding the buck gain and an output signal of the first buck controller; and a first buck limiter generating the third gate signal by shaping an output signal of the first buck adder, and transferring the generated third gate signal to the upper switching element of the buck converter unit.

8. The buck-boost converter of claim 7, wherein the buck gain ($d_{buck}$) is derived by a ratio of the voltage ($V_B$) input from the battery to the voltage ($V_L$) output to the load, and satisfies [Formula 2]:

$$\text{buck gain } (d_{buck})=V_L/V_B, \qquad \text{[Formula 2]},$$

wherein $0<V_L/V_B<1$.

9. The buck-boost converter of claim 8, wherein the first buck calculator calculates the predicted current ($I_{L3}^*$) of the output coil based on an input current ($I_B$), the buck gain ($d_{buck}$), and the boost gain ($d_{boost}$), and the predicted current ($I_{L3}^*$) satisfies [Formula 3]:

$$I_{L3}^*=I_B^*(1-d_{boost})/d_{buck}, \qquad \text{[Formula 3]}.$$

10. The buck-boost converter of claim 9, wherein the buck switching on/off controlling unit further includes a buck NAND gate supplying an inversion signal of an output signal of a third buck limiter to the lower switching element of the buck converter unit.

11. The buck-boost converter of claim 10, further comprising a boost compensation unit provided in a front end of the boost switching on/off controlling unit and compensating the command current based on the command current and the buck gain.

12. The buck-boost converter of claim 11, wherein the boost compensation unit includes:

a multiplier deriving the predicted current by multiplying the command current and the calculated buck gain;

a third subtractor deriving error current between the predicted current of the multiplier and the command current;

an absolute value calculator deriving an absolute value of the error current of the first buck subtractor; and a fourth subtractor calculating a difference between the absolute value of the absolute value calculator and the input current, and transferring the difference to the amplifying unit.

13. The buck-boost converter of claim 12, wherein the buck switching on/off controlling unit is provided in a front end of the buck control module, and further includes a buck compensation unit compensating the predicted current of the buck switching on/off controlling unit in the buck mode based on the voltage output to the load and the voltage input from the battery, and the command current.

14. The buck-boost converter of claim 13, wherein the buck compensation unit further includes:
- a voltage compensation module deriving a voltage compensation value for voltage compensation based on a difference between the voltage output to the load and the voltage input from the battery;
- a current compensation module deriving a current compensation value for current compensation based on the input current of the battery and the command current; and
- a prediction current compensation module compensating the predicted current by adding the voltage compensation value, the current compensation value, and the predicted current.

15. The buck-boost converter of claim 14, wherein the voltage compensation module includes:
- a second buck subtractor deriving an error between the voltage output to the load and the voltage input from the battery;
- a buck proportional controller performing integral control for the error of the second buck subtractor; and
- a second buck limiter generating the current compensation value for shaping an output signal of the buck proportional controller.

16. The buck-boost converter of claim 15, wherein the current compensation module further includes:
- a third buck subtractor deriving an error between the command current and the input current of the battery; and
- a second buck controller generating the voltage compensation value by performing integral-proportional control for the error of the third buck subtractor.

17. The buck-boost converter of claim 16, of wherein the prediction current compensation module includes a second buck adder adding the predicted current, the first compensation value, and the second compensation value, and transferring a result to the first buck subtractor.

18. The buck-boost converter of claim 17, wherein in the boost mode, the first gate signal of the boost switching on/off controlling unit is applied to respective gate terminals of the upper switching element and the lower switching element of the boost converter unit in a PWM form, and thus the boost converter unit being provided with the DC power of the battery transfers power that is stepped up according to magnetic flux generated in the coil to the link unit, and in the buck mode, the third gate signal of the buck switching on/off controlling unit is applied to respective gate terminals of the upper switching element and the lower switching element of the buck converter unit in a PWM form, and thus the DC link voltage of the link unit, having become an overvoltage, is stepped down by the upper switching element and the lower switching element of the buck converter unit and transferred to the rectifying unit.

* * * * *